(12) United States Patent
Werner

(10) Patent No.: US 11,440,262 B2
(45) Date of Patent: Sep. 13, 2022

(54) METHOD FOR OPERATING AN APPARATUS FOR ADDITIVELY MANUFACTURING THREE-DIMENSIONAL OBJECTS

(71) Applicant: CONCEPT LASER GMBH, Lichtenfels (DE)

(72) Inventor: Jürgen Werner, Lichtenfels (DE)

(73) Assignee: CONCEPT LASER GMBH, Lichtenfels (DE)

(*) Notice: Subject to any disclaimer, the term of this patent is extended or adjusted under 35 U.S.C. 154(b) by 746 days.

(21) Appl. No.: 16/277,977

(22) Filed: Feb. 15, 2019

(65) Prior Publication Data

US 2019/0375162 A1   Dec. 12, 2019

(30) Foreign Application Priority Data

Jun. 7, 2018 (EP) .................................. 18176630.4

(51) Int. Cl.

| | |
|---|---|
| B29C 64/393 | (2017.01) |
| B33Y 50/02 | (2015.01) |
| B33Y 10/00 | (2015.01) |
| B33Y 30/00 | (2015.01) |
| B23K 26/342 | (2014.01) |
| B29C 64/153 | (2017.01) |
| B29C 64/20 | (2017.01) |

(Continued)

(52) U.S. Cl.
CPC ............ B29C 64/393 (2017.08); B22F 10/20 (2021.01); B23K 26/342 (2015.10); B28B 1/001 (2013.01); B28B 17/0081 (2013.01); B29C 64/153 (2017.08); B29C 64/20 (2017.08); B33Y 10/00 (2014.12); B33Y 30/00 (2014.12); B33Y 50/02 (2014.12); *B22F 10/30* (2021.01)

(58) Field of Classification Search
CPC ..... B29C 64/393; B29C 64/153; B29C 64/20; B29C 64/135; B29C 64/268; B22F 10/20; B22F 12/00; B23K 26/342; B33Y 10/00; B33Y 30/00; B33Y 50/02
USPC .......................................................... 700/117
See application file for complete search history.

(56) References Cited

U.S. PATENT DOCUMENTS

| | | | |
|---|---|---|---|
| 2014/0332507 A1 | 11/2014 | Fockele | |
| 2015/0057782 A1 | 2/2015 | Kopeland et al. | |
| 2018/0281278 A1* | 10/2018 | George | ................. B29C 64/264 |

FOREIGN PATENT DOCUMENTS

| | | |
|---|---|---|
| CN | 102229245 A | 11/2011 |
| CN | 104503711 A | 4/2015 |

(Continued)

OTHER PUBLICATIONS

European Search Report Corresponding to Application No. 18176630 dated Nov. 26, 2018.

(Continued)

*Primary Examiner* — Michael J Brown
(74) *Attorney, Agent, or Firm* — Dority & Manning, P.A.

(57) ABSTRACT

Method for operating an apparatus (1) for additively manufacturing three-dimensional objects (2) by means of successive layerwise selective irradiation and consolidation of layers of a build material (3) which can be consolidated by means of an energy source, wherein irradiation data define at least two regions (8, 9) of object data relating to a three-dimensional object (2), which regions (8, 9) are irradiated based on at least two different irradiation parameters.

13 Claims, 2 Drawing Sheets

(51) Int. Cl.
B28B 1/00     (2006.01)
B28B 17/00    (2006.01)
B22F 10/20    (2021.01)
B29C 64/135       (2017.01)
B29C 64/268       (2017.01)
B22F 10/30        (2021.01)

(56)         References Cited

FOREIGN PATENT DOCUMENTS

| CN | 106273440 A  | 1/2017  |
|----|--------------|---------|
| CN | 106392071 A  | 2/2017  |
| CN | 107150439 A  | 9/2017  |
| JP | H04255080 A  | 9/1992  |
| JP | 2001/277368 A | 10/2001 |
| JP | 2004/284025 A | 10/2004 |
| WO | 2015096693 A1 | 7/2015  |
| WO | 2016201309 A1 | 12/2016 |
| WO | 2017174112 A1 | 10/2017 |

OTHER PUBLICATIONS

Machine Translated Japanese Search Report Corresponding to Application No. 2019107224 dated Nov. 9, 2020.

* cited by examiner

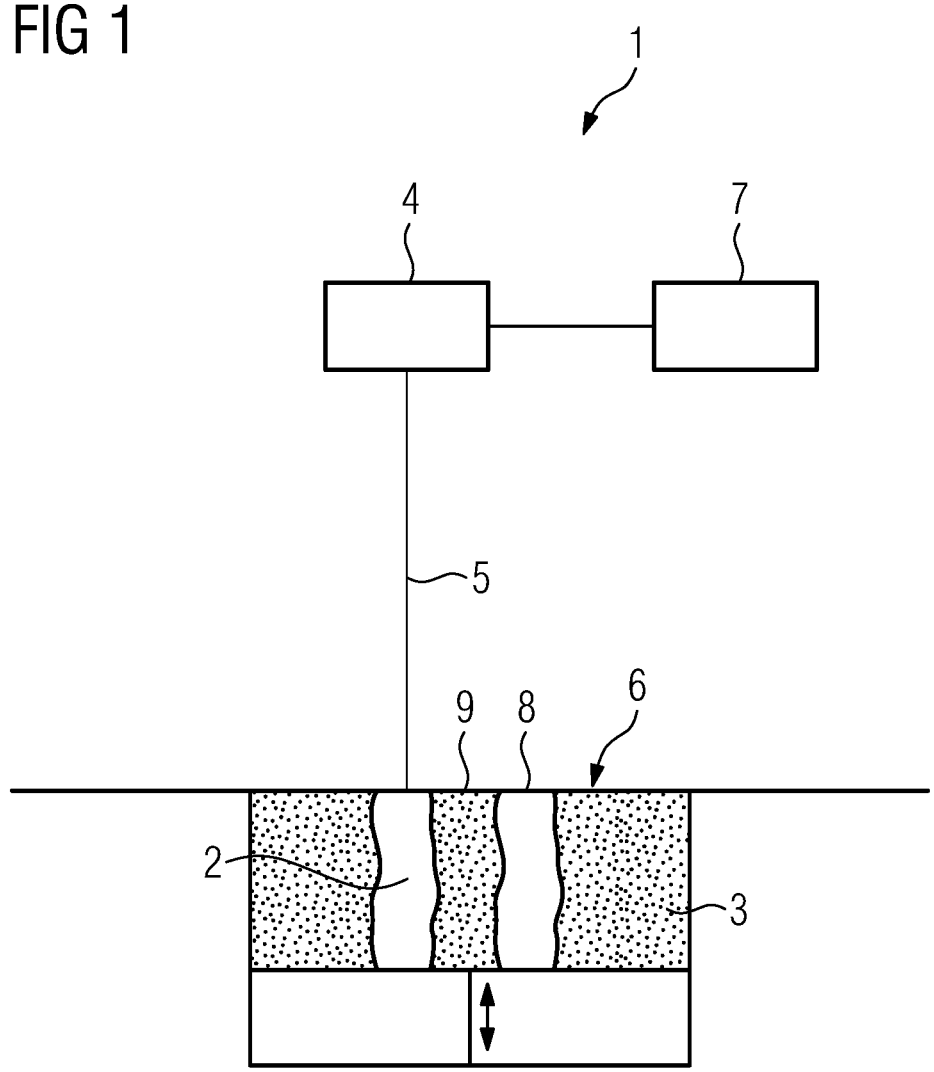

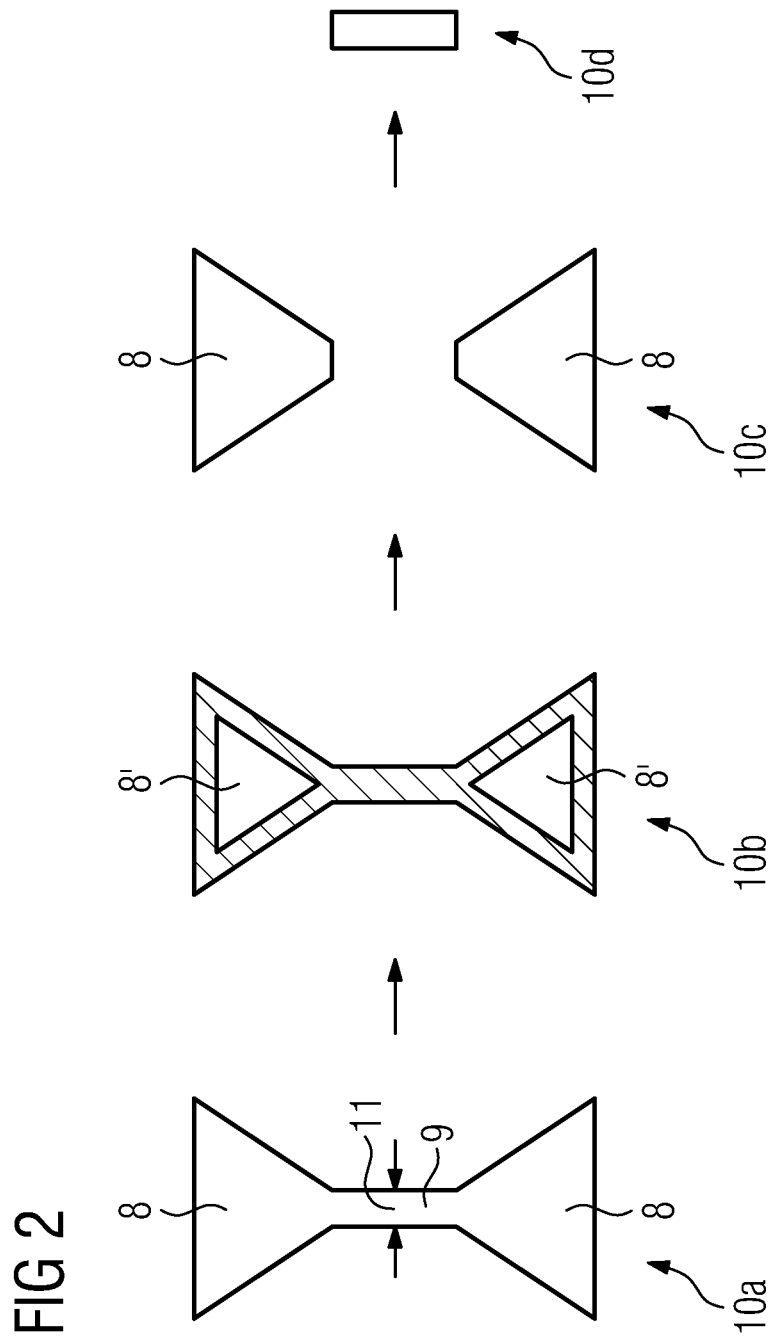

METHOD FOR OPERATING AN APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 176 630.4 filed Jun. 7, 2018, the contents of which is incorporated herein by reference in its entirety as if set forth verbatim.

The invention relates to a method for operating an apparatus for additively manufacturing three-dimensional objects by means of successive layerwise selective irradiation and consolidation of layers of a build material which can be consolidated by means of an energy source, wherein irradiation data define at least two regions of object data relating to a three-dimensional object, which regions are irradiated based on at least two different irradiation parameters.

Apparatuses for additively manufacturing three-dimensional objects and methods for operating the same are generally known from prior art. Usually an energy source is used to successively and selectively consolidate layers of a build material, wherein irradiation data may be used for defining how the irradiation process is performed. In particular, the irradiation data may define two or more regions of object data, which object data relate to a three-dimensional object that is to be built in the additive manufacturing process. The two or more regions can be irradiated based on at least two different irradiation parameters.

Further, it is known from prior art that different areas of the object or different areas to be irradiated require different irradiation parameters. For example, filigree parts or delicate geometrical details of an object require different irradiation parameters than a comparatively massive structure of, e.g. a core part, of the object. Thus, usually a compromise is to be found between lower intensities of the energy source, such as a lower powered energy beam, that enables the use of a comparatively smaller spot sizes required to irradiate filigree details, and a comparatively higher powered energy source, such as higher a powered energy beam, that enables the irradiation of larger areas at the same time, in particular using larger spot sizes to irradiate and thereby consolidate the build material. In other words, a compromise has to be found between a high writing speed and a high resolution of geometrical details.

To ensure that all geometrical details are properly irradiated, usually the energy and the spot size or other irradiation parameters are chosen dependent on the requirements of such fine structures, wherein larger or more massive parts of the object are also irradiated based on the irradiation parameter that has been chosen leading to a comparatively higher writing time than necessary.

It is enough object of the present invention to provide a method for operating an apparatus for additively manufacturing three-dimensional objects, wherein the irradiation process is improved, in particular a proper irradiation of filigree parts and a reduction of the writing time is achieved.

The object is inventively achieved by a method according to claim 1. Advantageous embodiments of the invention are subject to the dependent claims.

The method described herein is a method for operating an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a method for operating an additive manufacturing apparatus. The method may also be deemed as a method for additively manufacturing a three-dimensional object by means of successive layerwise selective irradiation and consolidation of layers of a build material which can be consolidated by means of an energy source. In either case, irradiation data may be provided that define two or more regions of object data that relate to a three-dimensional object, which two or more regions are irradiated based on at least two different irradiation parameters. The invention is based on the idea that at least one first irradiation parameter is assigned to at least one first region and at least one second irradiation parameter is assigned to at least one second region based on geometry information of the first region and the second region and/or that at least one first region is irradiated based on at least one first irradiation parameter and at least one second region is irradiated based on at least one second irradiation parameter based on a geometry information of the first region and the second region. Thus, it is inventively achieved that the irradiation of the two or more different regions is performed based on the geometry information of the corresponding region.

In other words, geometry information can be provided that define the geometry, for example the shape or the structural distribution of the area that is to be irradiated in the respective region. Based on the geometry information it is possible to assign a suitable irradiation parameter or choose a suitable irradiation parameter for the irradiation of the specific region. Likewise, it is possible that at least one first region is irradiated based on at least one first irradiation parameter and at least one second region is irradiated based on at least one second irradiation parameter based on a geometry information of the first region and the second region. For example, if the first region and the second region differ in the geometry information, for example in the geometrical shape of the area that needs to be irradiated, such as comprising a different cross-section of the object in the first region and the second region, it is possible to assign different irradiation parameters based on which the irradiation process is performed while irradiating the first region or the second region. For example, the first region may comprise geometrical details, i.e. filigree parts of the object, wherein the second region comprises a massive part of the object.

Thus, it is possible to assign a first irradiation parameter to the at least one first region, wherein the irradiation process for irradiating the at least one first region is performed based on the first irradiation parameter and it is possible to assign a second irradiation parameter to the at least one second region, wherein the irradiation process for irradiating the at least one second region is performed based on the second irradiation parameter. Hence, the first region(s) may be irradiated taking into calculation that the first region comprises fine structures (in this example), such as geometrical details, in particular filigree parts of the object, allowing for a reduction of the spot size and/or the intensity of an energy beam used to irradiate the build material, whereas the second region can be irradiated with a comparatively larger spot size and/or large intensity of the energy beam allowing for a reduction of the writing time. Of course, the first and second regions referred to are to be understood as merely exemplary. It is also possible that the second region(s) comprise filigree parts and the first region(s) comprise massive parts of the object. Further, it is possible that an arbitrary number of additional regions, such as third or fourth regions can be provided, wherein each region can comprise an arbitrary part of the object.

The term "irradiation parameter" may refer to any arbitrary parameter influencing or affecting the irradiation process, such as an intensity of the energy beam and/or the energy that is deposited in the build material and/or the power of the energy beam and/or or the spot size and/or the geometrical shape of the spot in the build plane and/or the intensity distribution of the spot in the build plane and/or a scanning speed with which the energy beam is guided across the build plane and the like. Of course, the list is non-exhaustive. Self-evidently, an (irradiation) parameter set can be formed including two or more of such irradiation parameters, wherein it is also possible that different parameter sets are assigned to the first region and the at least one second region, wherein the at least two irradiation parameter sets may differ in at least one irradiation parameter included in the parameter set.

Besides, the invention relates to a method for generating irradiation data for at least one apparatus for additively manufacturing three-dimensional objects by means of successive layerwise selective irradiation and consolidation of layers of a build material which can be consolidated by means of an energy source, wherein irradiation data define at least two regions of object data relating to a three-dimensional object, which regions are irradiated based on at least two different irradiation parameters, wherein at least one first irradiation parameter is assigned to at least one first region and at least one second irradiation parameter is assigned to at least one second region based on a geometry information of the first region and the second region.

Of course, all features, details and advantages described throughout this application with respect to the inventive method for operating an apparatus for additively manufacturing three-dimensional objects are fully transferable to the method for generating irradiation data for at least one apparatus for additively manufacturing three-dimensional objects and vice versa. In particular, it is possible to generate irradiation data via the inventive method for generating irradiation data to be used in the method for operating an apparatus for additively manufacturing three-dimensional objects. Self-evidently, if reference is made to "the inventive method" both, the inventive method for operating the apparatus and the inventive method for generating the irradiation data can be referenced.

According to a first embodiment of the inventive method, the geometry information comprises at least one dimension of the corresponding region, in particular a length or a width of the corresponding region. Hence, it is possible to take into account the at least one information of the corresponding region via the geometry information, for example, defining a length or width of the corresponding region that is to be irradiated. Thus, it is possible to base the irradiation process or perform the irradiation process based on the geometry of the region that is to be irradiated, wherein it is possible to assign different irradiation parameters to the corresponding regions dependent on the length of the width of the region. Hence, smaller regions or regions with smaller geometrical features can be identified, wherein it is possible to assign the proper irradiation parameter, wherein it is, of course, also possible to identify larger regions that allow for using comparatively higher energies or larger spot sizes to reduce the writing time, wherein the corresponding irradiation parameters can be assigned to each region dependent on at least one dimension of the corresponding region. Advantageously, it is possible to identify all dimensions of the corresponding region to determine geometrical details present in the region.

The inventive method can further be improved in that a threshold value is defined, wherein at least one first irradiation parameter or at least one second irradiation parameter is assigned to a corresponding region dependent on a comparison between the threshold value and the geometry information of the corresponding region. According to this embodiment, a threshold value can be defined that allows for a definition of ranges of the geometry information, for example the length and/or the width of the corresponding region. As described before, dependent on the dimension of the region, it is possible to decide whether fine geometrical features are present in the corresponding region or whether the region allows for a comparatively faster irradiation process using a higher intensity and/or a larger spot size. The threshold value allows for defining above which or below which dimension which irradiation parameter or parameter set is assigned to the corresponding region. Of course, it is possible to define multiple threshold values and assign the corresponding irradiation parameter to the region dependent above or below which threshold value the dimension of the corresponding region lies, for example which threshold value is closest to the geometry information of the corresponding region.

It is particularly possible that the at least one first irradiation parameter may be assigned to a region, if the geometry information of the region exceeds or matches the threshold value and at least one second irradiation parameter may be assigned to the or a region, if the geometry information falls below the threshold value or vice versa. Hence, the geometry information, as described before, defines or comprises at least one dimension of the corresponding region. Thus, the threshold value also describes or defines a corresponding dimension of a structure of the region above which or below which a specific irradiation parameter or parameter set is assigned to the corresponding region. Thus, dependent on the specific type of the geometry information, such as a length or a fineness, for instance, it is possible to assign the corresponding parameter, if the geometry information exceeds or falls below the threshold value. Of course, it is also possible to assign the parameter dependent on the geometry information matching the threshold value to either the first irradiation parameter or the second irradiation parameter.

According to another preferred embodiment of the inventive method, intermediate object data can be generated based on the object data relating to a geometry of the three-dimensional object, wherein at least one part of the contour of the three-dimensional object that is defined by the original object data of the three-dimensional object is decreased by the threshold value and structures of the object that are defined by the original object data comprising a corresponding dimension below a threshold value are removed and the at least one part of the contour is increased to the initial value. Therefore, the original object data are used to generate the intermediate object data, wherein at least one part of the contour, in particular the entire contour of the three-dimensional object that is defined by the original object data is used. The at least one part of the contour is decreased by the threshold value, as described before. The term "decrease" in the scope of this embodiment may refer to the reduction of the outer dimension of the object, as defined by the object data. For example, if the object data in the corresponding layer describe a circle (region) with a diameter of 1 cm, it is possible to decrease the contour of the three-dimensional object for that layer by a threshold value, such as 1 mm, resulting in a circle (region) of 0.9 cm in diameter.

All structures of the object (in that specific layer or over the entire object) that match or fall below the threshold value are removed from the object data, as the structure of the object, as described before, is reduced/decreased by the threshold value. In other words, all structures or geometrical features, as defined by the object data, that comprise a dimension that is below or matches the threshold value, will vanish from the object data, as they are decreased. Subsequently, it is possible to increase the at least one part of the contour, in particular the structure of the object, back to its initial value, wherein the structures of the object that have been removed from the object data remain removed and are not increased to the initial value again. Hence, the intermediate object data only comprise structures that are above the threshold value and therefore, the intermediate object data only comprise regions a corresponding irradiation parameter allowing for a fast writing speed using a comparatively higher intensity and/or a comparatively larger spot size, can be used.

The embodiment described before can advantageously be improved in that at least one first irradiation parameter may be assigned to regions present in the intermediate object data and at least one second irradiation parameter may be assigned to regions present in the original object data and absent in the intermediate object data and/or in that and/or regions present in the intermediate object data are irradiated based on at least one first irradiation parameter and regions present in the original object data and absent in the intermediate object data are irradiated based on at least one second irradiation parameter. Hence, as described before, the second irradiation parameter, for example a comparatively lower intensity and/or a comparatively smaller spot size, can be assigned to regions that are only present in the original object data but not in the intermediate object data, i.e. regions comprising geometrical features with a dimension below the threshold value, whereas the first irradiation parameter, for example a comparatively higher intensity and/or a comparatively larger spot size, can be assigned to regions that are present in the intermediate object data. In other words, the intermediate object data only comprise regions that can be irradiated fast and with a comparatively higher energy and/or larger spot size, whereas regions or structures that have been removed and are not present in the intermediate object data, as described before, comprise finer structures of the object that require smaller spot sizes and/or lower intensities, for instance.

Further, it is possible that fine structure data are determined by performing a comparison and/or a logical operation, in particular a Boolean operation, between the original object data and the intermediate object data, wherein at least one first irradiation parameter may be assigned to regions present in the intermediate object data and at least one second irradiation parameter may be assigned to regions present in the fine structure data and/or wherein regions present in the intermediate object data are irradiated based on at least one first irradiation parameter and regions present in the fine structure data are irradiated based on at least one second irradiation parameter. Therefore, by performing the comparison and/or the logical operation it is possible to define the intermediate object data, which, as described before, comprise the regions of the object data that can be irradiated fast and with a comparatively higher intensity and/or larger spot size, whereas the fine structure data comprise regions that require a comparatively smaller spot size and/or a lower intensity of the energy beam to ensure that the geometrical details present in the fine structure data are irradiated properly. By dividing the regions of the object data into the intermediate object data and the fine structure data, it is not necessary to find a compromise between the irradiation of fine geometrical details and massive parts of the object. Further, it is not necessary to use irradiation parameters limiting the maximum possible writing speed in massive parts of the object or using irradiation parameters that unduly limit the resolution of fine details, for instance.

Besides, the invention relates to an apparatus for additively manufacturing three-dimensional objects by means of successive layerwise selective irradiation and consolidation of layers of a build material which can be consolidated by means of an energy source based on irradiation data, in particular irradiation data generated via a method according to one of the preceding claims, wherein the apparatus is connected or connectable with a control unit that is adapted to generate or receive the irradiation data, wherein the irradiation data define at least two regions of object data relating to a three-dimensional object, wherein the apparatus is adapted to irradiate the at least two regions based on at least two different irradiation parameters, wherein the control unit is adapted to assign at least one first irradiation parameter to at least one first region of the object data and adapted to assign at least one second irradiation parameter to at least one second region of the object data based on geometry information of the first region and the second region and/or to control irradiating at least one first region based on at least one first irradiation parameter and control irradiating at least one second region based on at least one second irradiation parameter based on a geometry information of the first region and the second region.

Of course, all features, details and advantages that are described with respect to the inventive methods, in particular the inventive method for operating the additive manufacturing apparatus and/or the method for generating the irradiation data, are fully transferable to the inventive apparatus and vice versa. The same applies to the control unit.

The inventive apparatus comprises the control unit that is adapted to assign the at least one first irradiation parameter to at least one first region of the object data and adapted to assign at least one second irradiation parameter to at least one second region of the object data based on geometry information of the first region of the second region and/or to control irradiating at least one first region based on at least one first irradiation parameter and control irradiating at least one second region based on at least one second irradiation parameter based on a geometry information of the first region and the second region. In other words, the inventive method for operating the apparatus may be performed on the inventive apparatus, preferably using the inventive control unit.

The control unit may further be adapted to define or receive a threshold value, wherein the control unit may be adapted to assign at least one first irradiation parameter or at least one second irradiation parameter to a corresponding region of the object dependent on a comparison between the threshold value and the geometry information of the corresponding region. For example, it is possible that the control unit may assign at least one first irradiation parameter to a region comprising a geometry information that exceeds or matches the threshold value and adapted to assign at least one second irradiation parameter to the or a region with a geometry information that falls below the threshold value or vice versa.

As described before, it is possible to assign the corresponding irradiation parameter to a specific region, dependent on the geometry information, determined via the comparison between the geometry information and the threshold value. Again, it can be arbitrarily chosen whether the geometry information matching the threshold value leads to an assignment of the at least one first irradiation parameter or the at least one second irradiation parameter to the specific region. Further, whether the first irradiation parameter or the at least one second irradiation parameter is assigned to the corresponding region depends on the type of parameter comprised in the geometry information, for example a fineness and/or or a dimension of the corresponding region.

According to another embodiment of the inventive apparatus, it is also possible to generate intermediate object data, as described before, wherein the control unit may be adapted to generate the intermediate object data based on the original object data relating to the geometry of the three-dimensional object, wherein the control unit may be adapted to decrease at least one part of the contour of the three-dimensional object that is defined by the original object data of the three-dimensional object by the threshold value and remove structures of the object that are defined by the original object data comprising a corresponding dimension below the threshold value and increase the at least one part of the contour to the initial value. Hence, as described before, the original object data may be used to generate the intermediate object data, wherein the contour of the object, as defined for one or more, in particular all, of the corresponding layers, can be used by decreasing the part of the contour by the threshold value. Structures that match the threshold value and/or fall below the threshold value are removed from the object data, as the corresponding region is decreased. Subsequently, the at least one part of the contour that remains after the structures have been removed, is again increased to its initial value.

Further, the control unit may be adapted to assign at least one first irradiation parameter to regions present in the intermediate object data and adapted to assign at least one second irradiation parameter to regions present in the original object data and absent in the intermediate object data. As the intermediate object data only comprise regions that can be irradiated with a certain parameter set or using at least one first irradiation parameter allowing for a comparatively faster writing speed, the assignment of the at least one first parameter can be performed using the intermediate object data. On the other hand, it is possible to assign the at least one second irradiation parameter, for example a comparatively lower intensity of the energy beam and/or a comparatively smaller spot size, as the regions present in the original object data and absent in the intermediate object data comprise at least one geometrical feature requiring the use of the at least one second irradiation parameter.

In particular, it is possible to use the control unit to generate fine structure data by performing a comparison and/or a logical operation, in particular a Boolean operation, between the original object data and the intermediate object data, wherein the control unit may be adapted to assign at least one first parameter to regions present in the intermediate object data and adapted to assign at least one second irradiation parameter to regions present in the fine structure data. As described before, regions of the object, as defined via the object data, can be assigned to be irradiated using the at least one first irradiation parameter or the at least one second irradiation parameter, as the regions of the object can be divided into regions present in the intermediate object data or present in the fine structure data. The regions present in the intermediate object data can be irradiated using comparatively higher intensities or larger spot sizes, whereas regions present in the fine structure data require the use of comparatively smaller spot sizes and/or lower intensities, as the regions present in the fine structure data comprise finer geometrical features.

Exemplary embodiments of the invention are described with reference to the Fig. The Fig. are schematic diagrams, wherein FIG. 1 shows an inventive apparatus; and FIG. 2 shows original object data, intermediate object data and fine structure data.

FIG. 1 shows an apparatus 1 for additively manufacturing three-dimensional objects 2 by means of successive layer-wise selective irradiation and consolidation of layers of a build material 3 which can be consolidated by means of an energy source based on irradiation data. The apparatus 1 comprises an irradiation device 4 that is adapted to generate and guide an energy beam 5 over a build plane 6 in which the build material 3 is applied to be irradiated. The apparatus 1 is connected with a control unit 7 which is adapted to generate and receive irradiation data, wherein the irradiation data define multiple regions 8, 9 of object data that relate to the three-dimensional object 2, in particular the geometrical shape of the object 2. The control unit 7 is adapted to assign a first irradiation parameter set to the first regions 8 of the object data and the control unit 7 is further adapted to assign a second irradiation parameter set to the second region 9 of the object 2 based on geometry information of the first regions 8 and the second region 9. The assignment of the individual irradiation parameter sets to the corresponding regions 8, 9 is described below with respect to FIG. 2.

FIG. 2 shows top views onto irradiation data representing areas in the build plane 6 that are to be irradiated in the additive manufacturing process, for example in a corresponding layer of the object, as described with respect to FIG. 1, wherein the generation of the irradiation data is described with several stages of the generation process. The reference signs 10a-10d are used to refer or indicate the individual stages or type of object data or irradiation data that are generated in the process of generating the irradiation data, wherein the reference signs 10a-10d refer to the single process stages or types of irradiation data, as will be described below.

The reference sign 10a refers to the original object data, for example defining the area of the current layer of build material that needs to be irradiated to form the corresponding cross-section of the three-dimensional object 2. In other words, the object data as referenced by 10a represent the cross section of the object 2 that is to be irradiated in the current layer of build material 3 arranged in the build plane 6. In the cross-section that is depicted in FIG. 2, the object 2 comprises (exemplary) two first regions 8 and one second region 9. As described before, the assignment of the specific irradiation parameter set is performed dependent on geometry information of the first regions 8 and the second region 9.

Thus, a threshold value 11 is defined that specifies a dimension, for example a length or a width of the regions 8, 9, wherein the object data, in particular the original object data, as referred to by reference sign 10a, are decreased by the threshold value 11, as indicated by reference sign 10b. In other words, the contour of the area that needs to be irradiated in the current layer is decreased by the threshold value 11, wherein regions 9 of the original object data matching the threshold value 11 or falling below the threshold value 11, in particular the second region 9, are completely removed from the object data or vanish from the object data, respectively.

In the next process step, the intermediate object data, as described before, are generated in that the remaining structures of the object data are again increased to their initial value. In other words, the decreased first regions 8', as referred to by reference sign 10b, are again increased to their initial size forming the first regions 8, as referred to with the reference sign 10c, which are identical to the first regions 8 as referenced with 10a in the original object data. The first region 9 is not present in the intermediate object data, as the dimension of the second region 9 falls below the threshold value 11 and is therefore, removed from the object data.

Hence, the intermediate object data, as referred to by 10c only comprise first regions 8, in particular regions 8 that do not comprise fine geometrical details and can therefore, be irradiated achieving a faster writing speed, for example using a comparatively larger spot size and/or a comparatively higher intensity of the energy beam 5. Thus, the first regions 8 can be irradiated using a first irradiation parameter set comprising at least one first irradiation parameter, such as a first intensity of the energy beam 5 and/or a first spot size of the energy beam 5.

The control unit 7 may therefore, assign the first irradiation parameter set or at the at least one first irradiation parameter to the first regions 8, wherein the irradiation process for irradiating the first regions 8 can be performed based on the first irradiation parameter (set). Further, the control unit 7 may assign at least one second irradiation parameter set, i.e. comprising at least one second irradiation parameter to the second region 9, as the second region 9 is not present in the intermediate object data, as referred to by reference sign 10c, but is present in the original object data, as referred to by reference sign 10a. It is also possible to perform a comparison between the intermediate object data and the original object data, in particular a logical operation, such as a Boolean operation, wherein the intermediate object data and the original object data can be compared with each other. For example, the original object data can be subtracted from the intermediate object data resulting in fine structure data, as indicated by reference sign 10d, comprising the second region 9.

Advantageously, the control unit 7 is adapted to assign the first irradiation parameter or the first irradiation parameter set to the first regions 8 comprised in the intermediate object data and to assign the second irradiation parameter or the second irradiation parameter set to the second region 9 present in the fine structure data. By segmenting the original object data into the intermediate object data and the fine structure data, it is possible to use the proper irradiation parameter set or the at least one proper irradiation parameter for irradiating the different regions 8, 9 to form the three-dimensional object 2.

Therefore, it is not necessary to adjust one irradiation parameter set for all regions 8, 9 of the three-dimensional object 2 in order to find a compromise between using the first irradiation parameter set or the second irradiation parameter set. Instead, it is possible to segment the object data based on the geometry information of the respective regions 8, 9 of the object 2 and therefore, use the proper irradiation parameter or the proper irradiation parameter set based on the geometry information of the corresponding region 8, 9. Hence, a fast irradiation process can be achieved in which all geometrical features and details present in the object data can be properly irradiated. Of course an arbitrary number of regions 8, 9 can be determined or various threshold values 11 can be defined allowing for assigning various irradiation parameters (or parameter sets) to the individual regions 8, 9. It is further possible to perform the inventive method, as described before, for every layer of the object 2, for example for the object data describing the geometrical shape, e.g. the three-dimensional shape, of the object 2.

Self-evidently, the method for operating an apparatus for additively manufacturing three-dimensional objects 2 can be performed on the inventive apparatus 1. The inventive method for generating irradiation data can be used to generate irradiation data for the inventive apparatus 1, in particular to be used in an additive manufacturing process performed on the apparatus 1.

The invention claimed is:

1. A method for operating an apparatus for additively manufacturing three-dimensional objects by means of successive layerwise selective irradiation and consolidation of layers of a build material, the method comprising:
consolidating the layers of the build material by means of an energy source,
wherein an irradiation data defines at least two regions of object data relating to a three-dimensional object, which wherein the at least two regions are irradiated based on at least two different irradiation parameters,
assigning at least one first irradiation parameter to an at least one first region and at least one second irradiation parameter to an at least one second region based on a geometry information of the first region and the second region and/or
irradiating the at least one first region based on at least one first irradiation parameter and the at least one second region based on at least one second irradiation parameter based on a geometry information of the at least one first region and the at least one second region;
generating intermediate object data based on the object data relating to a geometry of the three-dimensional object,
wherein at least one part of a contour of the three-dimensional object that is defined by an original object data of the three-dimensional object is decreased by a threshold value and structures of the three-dimensional object that are defined by the original object data comprising a corresponding dimension below the threshold value are removed and the at least one part of the contour is increased to an initial value.

2. The method according to claim 1, wherein irradiation data defines at least two regions of object data relating to a three-dimensional object, wherein regions are irradiated based on at least two different irradiation parameters, wherein at least one first irradiation parameter is assigned to the at least one first region and the at least one second irradiation parameter is assigned to the at least one second region based on a geometry information of the at least one first region and the at least one second region.

3. The method according to claim 1, wherein the geometry information comprises at least one dimension of a corresponding region.

4. The method according to claim 3,
wherein the threshold value is defined,
wherein at least one first irradiation parameter or at least one second irradiation parameter is assigned to a corresponding region dependent on a comparison between the threshold value and the geometry information of the corresponding region.

5. The method according to claim 4, wherein the at least one first irradiation parameter is assigned to a region if the geometry information of the region exceeds or matches the threshold value, and at least one second irradiation parameter is assigned to the region if the geometry information falls below the threshold value or vice versa.

6. The method according to claim 1, wherein at least one first irradiation parameter is assigned to regions present in the intermediate object data and at least one second irradiation parameter is assigned to regions present in the original object data and absent in an intermediate object data and/or regions present in the intermediate object data are irradiated based on at least one first irradiation parameter and regions present in the original object data and absent in the intermediate object data are irradiated based on at least one second irradiation parameter.

7. The method according to claim 1, wherein fine structure data are determined by performing a comparison and/or a logical operation between the original object data and the intermediate object data,
wherein at least one first irradiation parameter is assigned to regions present in the intermediate object data and at least one second irradiation parameter is assigned to regions present in the fine structure data and/or regions present in the intermediate object data are irradiated based on at least one first irradiation parameter and regions present in the fine structure data are irradiated based on at least one second irradiation parameter.

8. An apparatus for additively manufacturing three-dimensional objects by means of successive layerwise selective irradiation and consolidation of layers of a build material, the apparatus comprising:
an energy source,
a control unit connected or connectable to the apparatus, that is adapted to generate or receive an irradiation data, wherein the irradiation data define at least two regions of object data relating to a three-dimensional object,
wherein the control unit is configured to cause the apparatus to irradiate the at least two regions based on at least two different irradiation parameters,
wherein the control unit assigns at least one first irradiation parameter to an at least one first region of the object data and assigns at least one second irradiation parameter to an at least one second region of the object data based on geometry information of the first region and the second region and/or controls irradiating the at least one first region based on at least one first irradiation parameter and controls irradiating at least one second region based on at least one second irradiation parameter based on a geometry information of the first region and the second region;
wherein the control unit is adapted to generate intermediate object data based on an original object data relating to a geometry of the three-dimensional object, wherein the control unit is adapted to decrease at least one part of a contour of the three-dimensional object that is defined by the original object data of the three-dimensional object by a threshold value and remove structures of the three-dimensional object that are defined by the original object data comprising a corresponding dimension below the threshold value and increase the at least one part of the contour to an initial value.

9. The apparatus according to claim 8, wherein the geometry information comprises at least one dimension of a corresponding region.

10. The apparatus according to claim 8, wherein the control unit defines or receives a threshold value, wherein the control unit assigns at least one first irradiation parameter or at least one second irradiation parameter to a corresponding region dependent on a comparison between the threshold value and the geometry information of the corresponding region.

11. The apparatus according to claim 10, wherein the control unit assigns at least one first irradiation parameter to a region comprising a geometry information that exceeds or matches the threshold value assigns at least one second irradiation parameter to a region with a geometry information that falls below the threshold value or vice versa.

12. The apparatus according to claim 8, wherein the control unit assigns at least one first irradiation parameter to the at least one first and/or at least one second regions present in the intermediate object data and assigns at least one second irradiation parameter to the at least one first and/or at least one second regions present in the original object data and absent in the intermediate object data.

13. The apparatus according to claim 8, wherein the control unit generates fine structure data by performing a comparison and/or a logical operation between the original object data and the intermediate object data, wherein the control unit assigns at least one first irradiation parameter to the at least one first and/or at least one second regions present in the intermediate object data and assigns at least one second irradiation parameter to the at least one first and/or at least one second regions present in the fine structure data.

* * * * *